Nov. 27, 1923.
S. J. POPLAWSKI
1,475,197
MOTOR DRIVEN MIXER
Filed Nov. 23, 1921
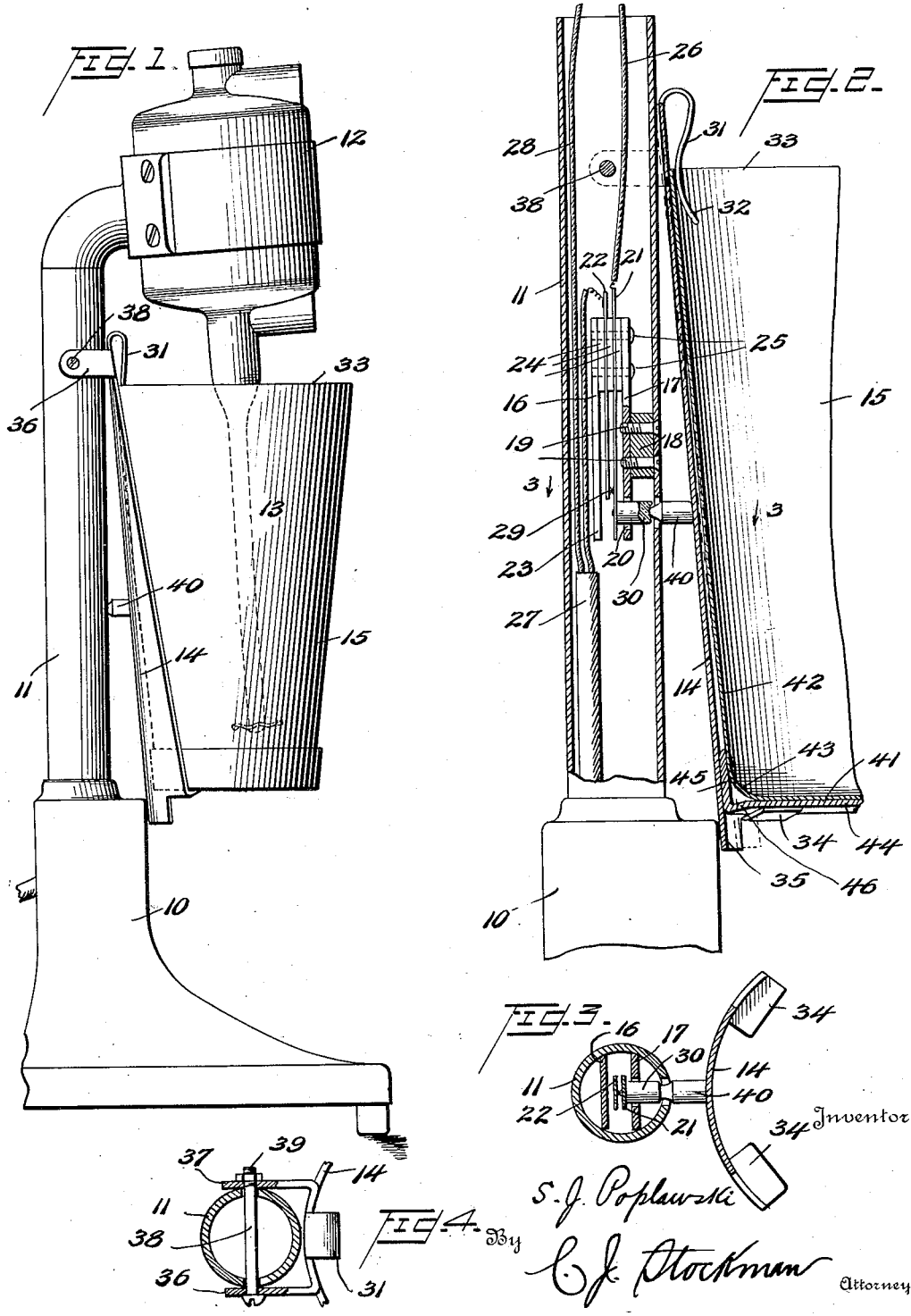

Patented Nov. 27, 1923.

1,475,197

UNITED STATES PATENT OFFICE.

STEPHEN J. POPLAWSKI, OF RACINE, WISCONSIN, ASSIGNOR, BY MESNE ASSIGNMENTS, TO THE GILCHRIST COMPANY, OF NEWARK, NEW JERSEY, A CORPORATION OF NEW JERSEY.

MOTOR-DRIVEN MIXER.

Application filed November 23, 1921. Serial No. 517,298.

*To all whom it may concern:*

Be it known that I, STEPHEN J. POPLAWSKI, a citizen of the United States, residing at Racine, in the county of Racine and State of Wisconsin, have invented certain new and useful Improvements in Motor-Driven Mixers, of which the following is a specification.

This invention relates to a motor-driven mixer, and more particularly to such a device in which a stirrer is driven by an electric motor and the switch actuated by placing a material receptacle in operative position with relation to the stirrer.

The embodiment of the invention selected for the purpose of disclosure of the principles thereof is a drink mixer comprising a base supporting an electric motor from which depends vertically a rotating stirrer, a container or receptacle support being mounted in association with said stirrer and movable in whole or in part upon the placing of the container upon the support to actuate the switch controlling the electric current.

The invention has for its object the provision in an agitating device and in association with an electric motor driven stirrer of a container support movable in whole or in part upon the placing of a container thereon to actuate the switch controlling the motor. Another object of the invention is the improvement of details of such a container support whereby all danger of accidental spilling of liquid interfering with the proper operation of the switch is avoided. Another object is the production of a device which can be actuated by a salesman with one hand. A still further object of the invention is the provision in a device of the character comprising a container support of a cooperating container which will be securely retained in place upon the support. A still further object is the provision of an easily attached support for a container.

Other objects and advantages of the invention will hereinafter appear in the following description and the novel features thereof will be particularly pointed out in the appended claims.

Like reference characters indicate like parts throughout the several figures of the drawings, in which—

Figure 1 is an elevation of my motor-driven mixer,

Figure 2 is an enlarged sectional view of portions of the several elements of the mixer showing in elevation the switch for controlling the electric motor, Figure 3 is a horizontal section taken upon the line 3—3 of Figure 2 with the container or receptacle removed from the support, and Figure 4 is a section through the pivotal connection between the supporting column and the container support.

It will be understood that the invention is susceptible of a number of embodiments, in which the details of construction may be varied, and that the specific embodiment illustrated and described herein is only indicative of the principles of the invention; however, this specific embodiment is one which has been found to be practical in its construction and operation.

The numeral 10 represents a base made of porcelain or other suitable material, supporting a column 11 with an electric motor 12 surmounting the same. From the motor depends a rotatable stirrer 13, the motor being mounted upon the column in such manner as to bring the stirrer out of parallelism with the column, as shown. Associated with the column is a container support 14 upon which is shown placed a receptacle or container 15. Within the column is a switch designated as a whole by the numeral 16, the normal position of which is open. I have provided means for closing this switch upon the placing of a container upon the support 14.

The switch 16 comprises a support plate 17, which is securely mounted within the column 11 by means of the block 18 and machine screws 19, 19, fitting in threaded openings in the plate. At the lower end of the plate 17 is an aperture 20 for a purpose hereinafter to appear, and at the upper portion thereof the plate supports the active elements of the switch consisting of spring members 21, 22, spaced from each other and from the supporting plate 17 and a back or protecting plate 23 by means of fiber or other insulating pieces 24, and the usual bushings for the connecting means. All of these parts are held securely clamped together by means of the screws 25. To the upper ends of spring members 21, 22, are attached wires leading to the motor and to a source of electric current, these wires being designated by the numerals 26 and 27, while the numeral 28 designates the wire which connects the motor with the source of current. At the lower portions of the springs are provided suitable contact points 29, and upon an extension of the spring 21 is mounted a button 30 of insulating material, which button passes through the aperture 20 in the plate 17 and is provided with a depression for the reception of an operating pin hereinafter referred to, it being understood that the column is apertured in register with the aperture 20 for the passage of the operating pin.

The container support has the general form of a triangular piece of metal, the apex of which is bent over to provide a spring hook 31, under the lip 32 of which the upper edge 33 of the container 15 is adapted to be inserted. The lower edge of the metal piece is bent at an angle to form a supporting ledge for the bottom of the container; in the present form this ledge is constituted by the lugs 34, 34, while the central portion is left unbent to constitute a stop lug 35 bearing upon the face of the base 10 and limiting the movement of the lower end of the support 14 toward the column 11. Throughout its length the triangular support is curved to conform substantially to the contour of the container or receptacle with which it is intended for use.

At the upper end of the support 14 apertured ears 36 and 37 are provided, and at a suitable height the column 11 is provided with aligned apertures. The ears 36 and 37 straddle the column 11 and are pivotally secured thereto by means of a bolt 38 having a screw threaded end 39 which fits the screw threaded aperture in the ear 37, holding the parts from accidental displacement.

At a point corresponding with the aligned apertures in the plate 7 and the column 11, there is attached to the back of the support 14 an operating pin 40, which as shown in full lines in Figure 2 has a pointed end pressing upon the recessed end of the button 30 and holding the points 29 on the springs 21 and 22 into contact.

The back of the hook 31 is shown slightly spaced from the column 11 but in the inoperative position of the parts this hook bears against the column 11 and constitutes a stop for the support 14 in its movement away from the column, it being understood that the spring 21 acting through button 30 and pin 40 is of sufficient strength to swing or pivot the lower end of the support 14 away from the base 11 when the container is removed, and at the same time break the contact between the points 19. The inactive position of the support 14 is shown in dotted lines in Figure 2.

The container which I have selected for use in connection with the specific embodiment of the support has the general form of a frustrum of a cone inverted. The body of the container is formed with bottom 41 and walls 42 in one piece with a curved juncture 43 therebetween. Upon the lower portion of the body there is pressed a cap 44, having a flange 45 connected to the bottom center through a circular downwardly bent portion 46, which forms with the flange 45 a peripheral bead of angular form. The container rests upon this bead and the ledges 34 are bent to conform to the shape thereof, in the present form being slightly upwardly projecting. The structure shown makes it necessary to lift the container somewhat in removing it from the support 14 and tends to prevent accidental removal as well as to accomplish the full seating of the container upon the support.

The operation of the invention will be understood from the description thereof in which the construction and operation of the several individual parts have been conjointly set forth. There remains therefore only a resume of the operation to a complete understanding of the invention.

Liquids or other materials to be mixed or agitated are placed into the container 15 and by the use of but a single hand the upper edge 33 of the container is inserted under the lip 32 of the spring hook 31 and raised sufficiently to permit the angled bead 46 to clear the edge of the ledge 34. By a movement toward the column 11 the wall of the container is caused to contact with the face of the support throughout substantially its full length when it may be dropped so that the angled bead will occupy the pocket formed by the ledge 34 and the face of the support. In this position of the parts the rotating stirrer will be within the container.

As soon as the weight of the container and its contents falls upon the support, the support will swing upon its pivot 38 and come to rest with the stop lug 35 against the base 10, as shown in full lines in Figure 2. This movement of the parts causes the pin 40 acting through button 30 and spring 21 to establish electrical contact through the switch and start the motor.

A reversal of these operations it is obvious will stop the motor and remove the container from its support with the contents thereof in a mixed or stirred condition.

It will be noted that the rotating stirrer in active operation is off the center of the body of liquid to be agitated. This has been found to produce a more rapid and thorough mixing of the ingredients than a central mounting of the stirrer. In the embodiment illustrated more room is provided for the insertion of the support, and there is less tendency for the liquid to splash out of the container while the drink is being mixed.

Having described my invention, what I claim as new and desire to secure by Letters Patent is:

1. In a motor driven mixer, the combination of a supporting column, an electric motor stationarily mounted on said column and having a depending stirring element supported in a substantially fixed position with respect to the motor, a movable container support carried by the column, and a switch for controlling said motor, said container-support being movable by the weight of a container and its contents to actuate the switch to start the motor.

2. In a motor driven mixer, the combination of a supporting column, an electric motor stationarily mounted at the upper end of said column and having a depending stirring element supported to rotate in a substantially fixed position with respect to the motor, a container support pivotally carried by the column, and a switch for controlling said motor, said container support being pivotally movable by the weight of a container and its contents to actuate the switch to start the motor.

3. In a motor driven mixer, the combination of a hollow supporting column, an electric motor mounted at the upper end of said column and having a depending stirring element supported to rotate in a substantially fixed position with respect to the motor, a movable container-support pivoted to the column, and a switch for controlling said motor, mounted inside of the column, said container support being movable by the weight of a container and its contents to actuate the switch to start the motor.

4. In a motor driven mixer, the combination of a supporting column, an electric motor mounted at the upper end of said column and having a depending stirring element supported to rotate in a substantially fixed position with respect to the motor, a movable container support carried by the column, a switch for controlling said motor, and means to yieldingly press the support into its normal position, said container-support being movable by the weight of a container and its contents away from its normal position to actuate the switch to start the motor and to keep it running.

5. In a motor driven mixer, the combination with a support, an electric motor mounted at the upper end of said support and having a depending stirring element, a container support movable upon the depositing of a container thereon, a switch for controlling said motor, and means for actuating said switch by the movement of said container support.

6. In a motor driven mixer comprising an electric motor with a depending stirrer, a supporting column therefor, a switch for controlling said motor associated with said column, a container support normally held under spring tension and movable upon the depositing of a container thereon, and connections between said container support and said switch to actuate said switch when the container is deposited upon said support.

7. In a motor driven mixer comprising an electric motor with a depending stirrer, a supporting column therefor, a switch for controlling said motor mounted within said column and having a spring pressed button projecting from said column, and a container support associated with said column and normally held therefrom by said switch button and movable under the weight of a container and its contents to actuate said switch to start the motor.

8. The combination with a supporting column, of an electric motor surmounting said column and having a depending stirrer, a container support pivoted at the upper portion of said column with its lower end movable toward and from the lower portion of the column, a switch within said column comprising spring elements normally holding the switch open, and connections between one of said spring elements and said container support, whereby the container support is normally held away from the column but capable of movement toward the same under the weight of a container to actuate said switch.

9. The combination of a supporting column, an electric motor mounted on said column and having a depending stirrer, a container-support outside of the column and pivoted adjacent its upper end to said column, so its lower end will be movable towards and from the column, and a switch for controlling the motor, the lower end of said support being yieldingly held away from the column, and being shiftable by the weight of a container and its contents to close the switch to start the motor when the container is deposited on the support, and to retain the switch closed while it remains on said support.

10. In a motor driven mixer, the combination with a supporting column, of a motor switch associated with said column having an operating button projecting therefrom, and a container support in the path of said button and movable under the influence of the weight of its container to actuate said switch.

11. In a motor driven mixer, the combination with a supporting column, a motor switch mounted within said column and having an operating button projecting therefrom, and a container support pivoted at its upper end to said column and having an intermediate portion in the path of said button, said container support being movable to push said button inwardly to actuate the switch upon the placing of a container thereon.

12. In a mixer, the combination of a supporting column, a container support pivoted at its upper end to said column and having a body portion conforming in curvature to the shape of the container, and means on said support for engaging the mouth edge and the bottom of said container.

13. In a mixer the combination of a supporting column, a container support outside of and having its upper end pivoted to the upper portion of said column, the body of the support being curved to conform to a container, and having means at its upper and lower portions to hold the container thereon, and means to yielding hold the lower portion of the support away from the column.

14. In a mixer, the combination of a supporting column, a container support having its upper end pivoted to the upper portion of said column, the body of the container support being curved to receive a container and having means at its upper and lower portions to engage portions of the container, and means for confining the pivotal movement of said container support.

15. In a mixer, the combination of a supporting column, a container support having apertured ears at its upper end by means of which it is pivoted to said column, a spring hook for engaging the mouth edge of the container and limiting the movement from the column, a ledge at the lower end for the reception of the bottom edge of a container, and a stop lug for limiting the movement of the container support toward said column.

16. The combination of a supporting column, a container having the general form of a frustum of a cone inverted, and a container-support separate from the column and comprising a substantially triangular transversely curved body-portion provided with means whereby it may be connected to the column, with means for engaging the edge of a container and at its lower end with a ledge for supporting the container.

17. The combination of a supporting column, a container having the general form of a frustum of a cone inverted, and a container-support pivoted to the column and comprising a substantially triangular transversely curved body-portioned provided at its upper end with means whereby it may be connected to the column, with means for engaging the edge of a container and at its lower end with a ledge for supporting the container.

18. The combination of a supporting column, a container having the general form of a frustum of a cone inverted, and a container support pivoted to the column and comprising a substantially triangular body portion provided at its upper end with an integral means whereby it may be connected to the column, with an integral hook for engaging the edge of a container, and at its lower end with an integral ledge for supporting the container.

19. The combination of a container having the general form of a frustum of a cone inverted and at its bottom provided with a peripheral bead, a support therefor comprising a substantially triangular body portion provided with a spring hook to engage over the edge of the container wall and at its lower end with a ledge conforming in shape to said peripheral bead for centering said container upon said support.

In testimony whereof I affix my signature.

STEPHEN J. POPLAWSKI.